United States Patent
Ahn et al.

(10) Patent No.: US 11,766,143 B2
(45) Date of Patent: Sep. 26, 2023

(54) COOKING UTENSIL WITH DOUBLE FOLDING

(71) Applicants: Hye Sung Ahn, Yongin-si (KR); Suk Min Moon, Gwangmyeong-si (KR)

(72) Inventors: Hye Sung Ahn, Yongin-si (KR); Suk Min Moon, Gwangmyeong-si (KR)

( * ) Notice: Subject to any disclaimer, the term of this patent is extended or adjusted under 35 U.S.C. 154(b) by 143 days.

(21) Appl. No.: 17/467,462

(22) Filed: Sep. 7, 2021

(65) Prior Publication Data

US 2022/0218134 A1 Jul. 14, 2022

(30) Foreign Application Priority Data

Jan. 8, 2021 (KR) .................. 10-2021-0002449
Jan. 22, 2021 (KR) .................. 10-2021-0009116

(51) Int. Cl.
*A47G 21/06* (2006.01)
*A47G 21/02* (2006.01)
*A47G 21/04* (2006.01)
*A47J 43/28* (2006.01)

(52) U.S. Cl.
CPC .......... *A47G 21/06* (2013.01); *A47G 21/023* (2013.01); *A47G 21/04* (2013.01); *A47J 43/281* (2013.01); *A47J 43/288* (2013.01)

(58) Field of Classification Search
CPC ...... A47G 21/06; A47G 21/023; A47G 21/04; A47G 21/02; A47J 43/281; A47J 43/288
USPC .................................. 30/147, 148, 149, 150
See application file for complete search history.

(56) References Cited

U.S. PATENT DOCUMENTS

| 5,940,974 A * | 8/1999 | Lee .................. A47G 21/02 30/322 |
| 6,682,112 B2 * | 1/2004 | Neal .................. A47J 43/288 294/7 |
| 11,490,750 B1 * | 11/2022 | Su .................. A47G 21/06 |
| 2021/0127875 A1 * | 5/2021 | Cohen .................. A47G 21/04 |
| 2021/0386228 A1 * | 12/2021 | Mertzel .................. A47G 21/02 |

\* cited by examiner

Primary Examiner — Phong H Nguyen
(74) Attorney, Agent, or Firm — Revolution IP, PLLC

(57) ABSTRACT

Disclosed is a cooking utensil with double folding which includes a body part of which one of cooking utensils such as scoops, forks, spoons, flip, spatulas and cooking spoons is selectively formed from an end, a handle part, and a rotating part which includes at least two or more holes formed in one side and the other side thereof so that one end is connected to the first rack portion and the other end is connected to the second rack portion to be doubly foldable.

4 Claims, 4 Drawing Sheets

Rotatable  Non-Rotatable (a)  (b)

(a)

(b)

COOKING UTENSIL WITH DOUBLE FOLDING

CROSS-REFERENCE TO RELATED APPLICATION

This application claims under 35 U.S.C. § 119(a) the benefit of Korean Patent Application Nos. 10-2021-0002449 filed on Jan. 8, 2021 and 10-2021-0009116 filed on Jan. 22, 2021, the entire contents of which are incorporated herein by reference.

BACKGROUND

(a) Technical Field

The present invention relates to a rotatable cooking utensil, and more particularly, to a cooking utensil with double folding which includes a body part of which one of cooking utensils such as scoops, forks, spoons, spatulas, ladles and cooking spoons is selectively formed from an end, a handle part, and a rotating part which includes at least two or more holes formed in one side and the other side thereof so that one end is connected to a first rack portion and the other end is connected to a second rack portion to be doubly foldable.

(b) Background Art

Contents described in the background art merely provide background information on the present invention and do not constitute the related art.

Typical cooking utensils include ladles, spatulas, and the like. Since these cooking utensils are to cook using heat, a handle is attached so that a user can cook foods while being protected from heat.

The handle attached to a conventional cooking utensil is combined in a single-handed form. The single-handed handle is formed to be cooked with a single hand and elongated in a rod shape.

In these cooking utensils, the single-handed cooking utensil has an elongated handle to protect the user's hand from a heat source and is formed to be easily cooked, but when the single-handed cooking utensil is packed or stored, an unnecessary packing size is required or an unnecessary space is required, and thus there is a problem in a spatial limitation.

That is, in the single-handed cooking utensil, a packing material needs to be large by the length of the handle, and a storage space is also required by the length of the handle, and thus, safety is secured in the use, but it is considerably inconvenient in storage and packing during moving.

Furthermore, the single-handed cooking utensil is formed in a long fixed form and has inconvenience during moving due to the length of the handle when moving by gripping the single-handed handle after cooking the food. That is, a general single-handed cooking utensil has a problem in that the elongated handle is caught in the user's arm or caught in neighboring articles to spill the food. Furthermore, in order to reduce the occurrence of the problems, even if the handle of the single-handed cooking utensil is gripped by the user to be close to the body side of the cooking utensil, a non-gripped portion is interfered, and rather, the above-mentioned problems may occur.

To solve these problems, a foldable cooking utensil has been commonly used to reduce the length with folding so as to be store in a limited size of container or holder.

The foldable cooking utensil has a single rotating part to fold and store the cooking utensil. However, the conventional foldable cooking utensils had an inconvenient problem in cooking since the coupling is released by cooking acts such as mixing or overturning the food.

In order to solve the problems of the conventional single-handed cooking utensils and the cooking utensil with the single rotating part, in some domestic and overseas companies, there are cases of performing studies on a cooking utensil with double folding. However, cost required to have a double rotating structure is excessive to be actually productized, and if not, since the effect to the manufacturing cost of the device is not large and the market competitiveness was lowered compared to the conventional cooking utensils, commercialized cases could not be found.

Therefore, there is a need for the development of cooking utensils which can solve the problems in the prior arts as described above.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

Objects to be solved by the present invention are intended to complement the disadvantages of the above-mentioned prior arts, and objects of the present invention are as follows.

A first object of the present invention is to provide a cooking utensil with a double folding structure so that a loading volume during storage may be reduced.

A second object of the present invention is to provide a cooking utensil including a sliding part surrounding a rotating part so as to prevent a body part and a handle part from being folded by the rotating part during cooking and to freely fold the rotating part when the cooking utensil is unused after cooking.

The objects of the present invention are not limited to the aforementioned objects, and other objects, which are not mentioned above, will be apparent to a person having ordinary skill in the art from the following description.

According to an aspect of the present invention, there is provided a cooking utensil with double folding including a body part of which one of cooking utensils such as scoops, forks, spoons, spatulas, ladles and cooking spoons is selectively formed from an end, a handle part that has a stick shape so as to perform an action such as stirring, fixing, and the like during cooking, and a rotating part that is rotatable when the body part is connected to one side and a grab part is connected to the other side thereof.

The body part may include a first rack portion extended from one end thereof, the handle part may include a second rack portion extended from one end thereof, and the rotating part may include at least two or more holes formed in one side and the other side thereof so that one end is connected to the first rack portion and the other end is connected to the second rack portion to be doubly foldable.

One surface of the hole may be opened so that the body part, the handle part, and the rotating part are completely separated from each other.

The cooking utensil with double folding may further include a sliding part which is movable along one surface of the rotating part while surrounding the rotating part so as to prevent the body part and the handle part from being folded by the rotating part during cooking and freely fold the rotating part when unused.

The sliding part may include a sliding protrusion which protrudes from an inner surface of a lower portion of the sliding part so as to temporarily fix the sliding position, and the handle part may include at least two or more receiving grooves which are formed on a lower surface of the handle part so as to receive the sliding protrusions.

The sliding part may include a fixing protrusion which protrudes from an outer surface of the lower portion so that the cooking utensil is fixed in a folded state, and the body part may include a fixing groove which is formed on the lower surface of the body part to receive the fixing protrusion.

Additional solutions of the present invention will be partially described in the following description below, and can be partially easily identified from the description, or can be known by the embodiments of the present invention.

The above-described general description and the following detailed description are just illustrative and explanatory, and do not limit the present invention to be described in the appended claims.

Effects of the present invention configured as above are described as below.

First, it is possible to reduce a loading volume during storage after cooking by a double folding structure.

Second, it is possible to prevent a body part and a handle part from being folded by a rotating part during cooking and to freely fold the rotating part when the cooking utensil is unused.

The effects of the present invention are not limited to the aforementioned effects, and other effects not mentioned above will be clearly understood to those skilled in the art from the description of the appended claims.

DETAILED DESCRIPTION

Figure 1:
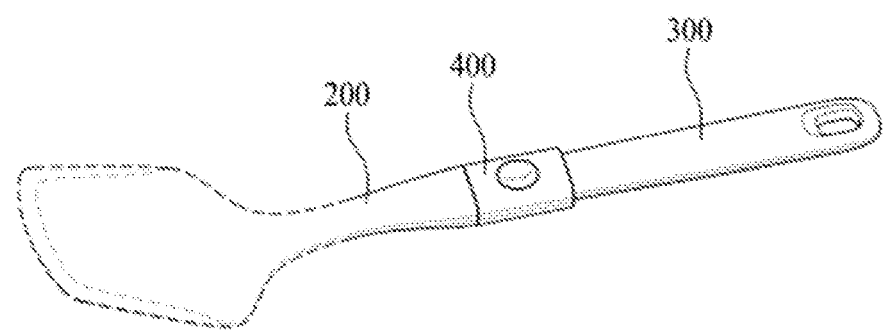
FIG. 1 is a perspective view of a cooking utensil with double folding according to an exemplary embodiment of the present invention.

Hereinafter, specific exemplary embodiments of the present invention will be described in detail with reference to the accompanying drawings.

However, in describing the exemplary embodiment of the present invention, detailed description of associated known function or constitutions will be omitted if it is determined that they unnecessarily make the gist of the present invention blur.

The aforementioned objects, features, and advantages of the present invention will be clearer through the following embodiments associated with the accompanying drawings. However, the present invention may make various modifications and include various exemplary embodiments, and hereinafter, specific exemplary embodiments will be illustrated in the drawings and described in detail.

The detailed description of known functions or configuration related with the present invention will be omitted if it is determined that they unnecessarily make the gist of the present invention blur. In addition, the numbers used in the description of the present invention are just identification symbols for distinguishing one component from other components.

In addition, the suffix "part" for the components used in the following description is used or combined to easily create the specification, and does not have a meaning or role that is distinguished from each other by itself.

FIG. 1 is a perspective view of a cooking utensil with double folding according to an exemplary embodiment of the present invention.

Figure 2:
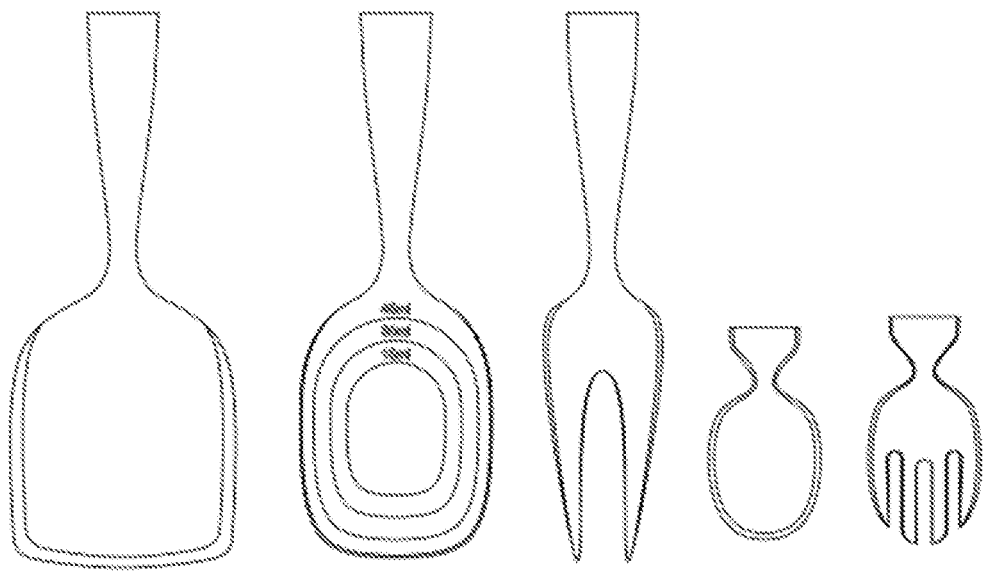
FIG. 2 is a diagram illustrating a shape of a body part according to an exemplary embodiment of the present invention.

FIG. 2 is a diagram illustrating a shape of a body part 200 according to an exemplary embodiment of the present invention.

A cooking utensil with double folding according to an exemplary embodiment of the present invention may include a body part 200, a handle part 300, and a rotating part 400.

In the body part 200, as illustrated in FIG. 2, one of cooking utensils such as scoops, forks, spoons, spatulas, ladles and cooking spoons may be selectively formed from an end thereof. Unlike this, one of other known cooking utensils may be selectively formed.

The handle part 300 may have a stick shape so as to perform an action such as stirring and the like during cooking.

The rotating part 400 is rotatable when the body part 200 is connected to one side and the handle part 300 is connected to the other side.

The body part 200 and the handle part 300 may also be formed of a rigid body with an unchanged shape (for example, metal such as iron, aluminum, copper, and the like or synthetic resin such as polystyrene (PS), ABS, polyacetal (POM), polyethylene (PE), polyvinyl chloride (PVC), polycarbonate (PC), polycaprolactone (PCL) and polypropylene (PP) may be selected and silicon may also be selected).

Figure 3:
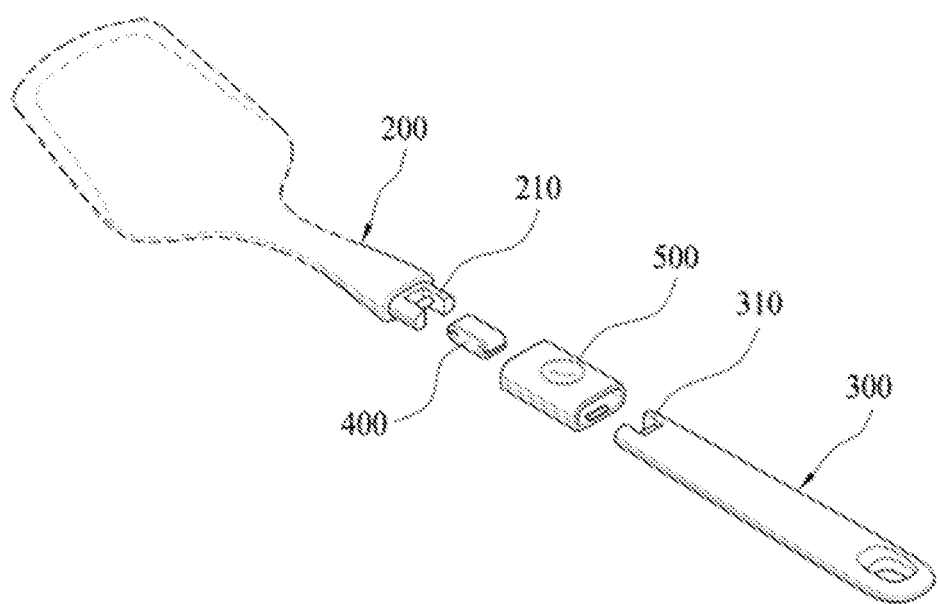
FIG. 3 is an exploded view of a cooking utensil according to an exemplary embodiment of the present invention.

FIG. 3 is an exploded view of a cooking utensil according to an exemplary embodiment of the present invention.

Figure 4:
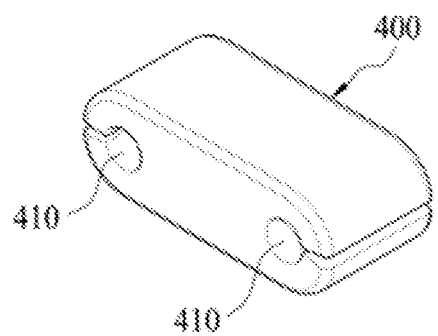
FIG. 4 is an enlarged view of a rotating part according to an exemplary embodiment of the present invention.

FIG. 4 is an enlarged view of a rotating part according to an exemplary embodiment of the present invention.

The body part 200 includes a first rack portion 210 extended from one end thereof and the handle part 300 may include a second rack portion 310 extended from one end thereof.

Furthermore, the rotating part 400 may include at least two or more holes 410 formed in one side and the other side thereof so that one end is connected to the first rack portion 210 and the other end is connected to the second rack portion 310 to be doubly foldable.

In the conventional cooking utensils, it has been pointed out a disadvantage that a rotating range is narrow due to a single rotating structure. However, according to an exemplary embodiment of the present invention, the cooking utensil with double folding has a plurality of rotating structures, so that the body part 200 disposed at a lower end of the rotating part 400 is 180° rotatable based on the rotating part 400 and the handle part 300 disposed at an upper end of the rotating part 400 is 180° rotatable and 360° rotatable in all directions.

Further, in the conventional cooking utensils, it has been pointed out a disadvantage that the single rotating structure is damaged and then cannot be rotated any longer, but the cooking utensil with double folding according to the present invention has the plurality of rotating parts to be rotatable in a predetermined range even if one rotating part is damaged.

As a result, the cooking utensil with double folding according to an exemplary embodiment of the present invention is rotated at 360° so that the body part 200 and a folding part may be folded with each other. Accordingly, a loading volume is reduced when the cooking utensil is stored before and after cooking to improve convenience of the user when moving with the cooking utensil due to an external activity such as camping or the like.

Furthermore, in the rotating part 400, one surface of the hole 410 may be opened so that the body part 200, the handle part 300, and the rotating part 400 may be completely separated from each other.

As a result, in the cooking utensil with double folding according to an exemplary embodiment of the present invention, even if the cooking utensil is contaminated by foreign matters such as oil stain and the like which may be generated during cooking, the body part 200, the handle part 300, and the rotating part 400 are completely separated from each other, thereby facilitating hygienic management such as washing or the like.

Figure 5:
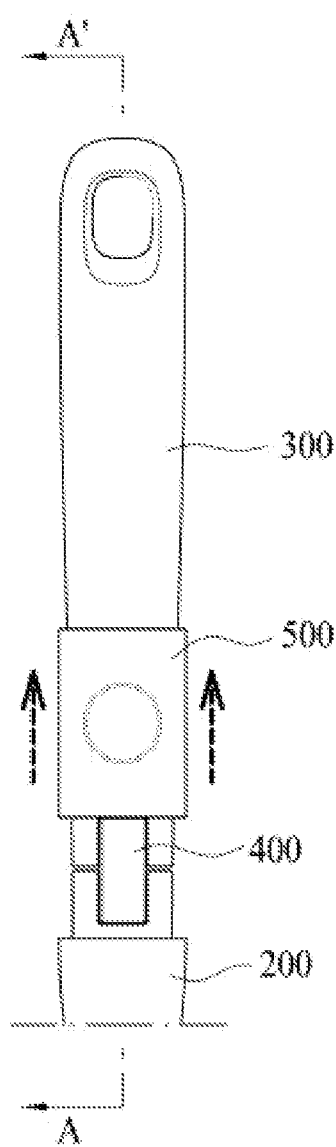
FIG. 5 is a plan view and a cross-sectional view of a sliding part according to an exemplary embodiment of the present invention.
Figure 5:
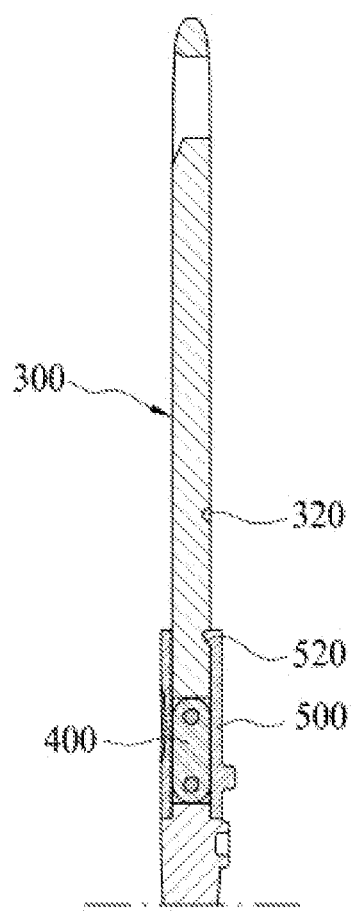

FIG. 5 is a plan view and a cross-sectional view of a sliding part 500 according to an exemplary embodiment of the present invention.

Figure 6:
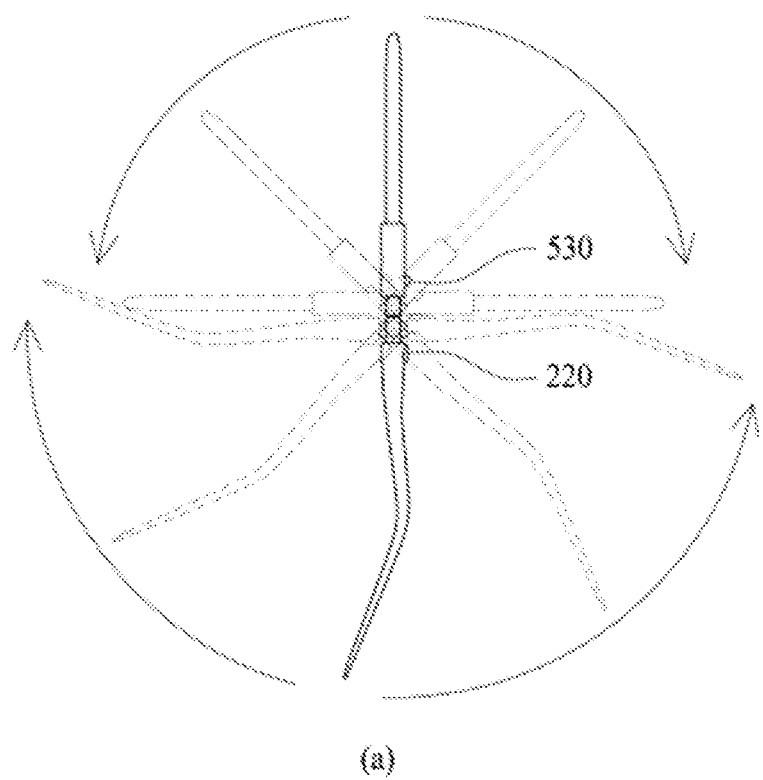
FIG. 6 is a schematic view of a fixing protrusion and a fixing groove according to an exemplary embodiment of the present invention.
Figure 6:
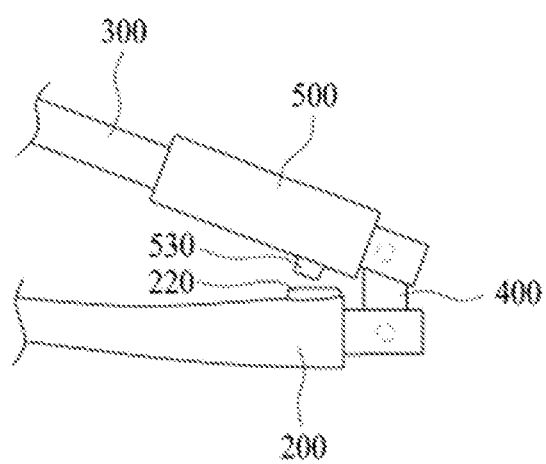

FIG. 6 is a schematic view of a fixing protrusion 530 and a fixing groove 220 according to an exemplary embodiment of the present invention.

According to another feature of the present invention, the cooking utensil with double folding may include a sliding part 500.

The sliding part 500 is movable along one surface of the rotating part 400 while surrounding the rotating part 400 as illustrated in FIG. 5A so as to prevent the body part 200 and the handle part 300 from being folded by the rotating part 400 during cooking and freely fold the rotating part 400 when unused.

The sliding part 500 may include a sliding protrusion 520 and a fixing protrusion 530 and the handle unit 300 may include a receiving groove 320 and the body part 200 may include a fixing groove 220.

The sliding protrusion 520 may protrude from an inner surface of a lower portion of the sliding part 500 so as to temporarily fix the position of the sliding part 500.

At least two or more receiving grooves 320 may be formed on a lower surface of the handle part 300 so as to receive the sliding protrusions 520 as illustrated in FIG. 5B.

The fixing protrusion 530 may protrude from an outer surface of the lower portion so that the cooking utensil may be fixed in a folded state.

The fixing groove 220 may be formed on the lower surface of the body part 200 to receive the fixing protrusion 530.

As a result, the cooking utensil with double folding according to the present invention may prevent the body part 200 and the handle part 300 from being rotated by the folding part during cooking by coupling and fixing the sliding protrusions 520 and the receiving groove 320 to each other. Further, during storing after cooking, the fixing protrusion 530 and the fixing groove 220 are coupled and fixed to each other so that the body part 200 and the handle part 300 may be fixed while rotated.

Meanwhile, a circular portion is engraved on the upper surface of the sliding part 500 to improve the convenience of the sliding operation of the user.

The exemplary embodiments just illustrate the technical spirit of the present invention and various changes and modifications can be made by those skilled in the art to which the present invention pertains without departing from an essential characteristic of the present invention.

The exemplary embodiments are not intended to limit the technical idea of the present invention, but are intended to be described, and therefore, the scope of the present invention is not limited by the exemplary embodiments.

The scope of the present invention should be construed by the appended claims, and all the technical ideas that are recognized as equivalent or even equal thereto should be construed as being included in the scope of the present invention.

What is claimed is:

1. A cooking utensil with double folding comprising:
   a body part of which one of cooking utensils such as scoops, forks, spoons, spatulas, ladles and cooking spoons is selectively formed from an end;
   a handle part that has a stick shape so as to perform an action such as stirring and fixing during cooking;
   a rotating part that is rotatable when the body part is connected to one side and the handle part is connected to the other side thereof; and
   a sliding part which is movable along one surface of the rotating part while surrounding the rotating part so as to prevent the body part and the handle part from being folded by the rotating part during cooking and freely fold the rotating part when unused,
   wherein the body part includes a first rack portion extended from one end thereof,
   the handle part includes a second rack portion extended from one end thereof, and
   the rotating part includes two holes formed in one side and the other side thereof so that one end is connected to the first rack portion and the other end is connected to the second rack portion to be doubly foldable.

2. The cooking utensil with double folding of claim 1, wherein one surface of the hole is opened so that the body part, the handle part, and the rotating part are completely separated from each other.

3. The cooking utensil with double folding of claim 1, wherein the sliding part includes a sliding protrusion which protrudes from an inner surface of a lower portion of the sliding part so as to temporarily fix the sliding position, and
   the handle part includes at least two or more receiving grooves which are formed on a lower surface of the handle part so as to receive the sliding protrusions.

4. The cooking utensil with double folding of claim 1, wherein the sliding part includes a fixing protrusion which protrudes from an outer surface of the lower portion so that the cooking utensil is fixed in a folded state, and
   the body part includes a fixing groove which is formed on the lower surface of the body part to receive the fixing protrusion.

* * * * *